Patented Dec. 5, 1939

2,182,286

UNITED STATES PATENT OFFICE 2,182,286

METHOD OF TREATING WATER SUPPLIES

Henry W. Doennecke and Emory W. Douglass, Tulsa, Okla., and Carl O. Anderson, Baxter Springs, Kans., assignors to Ozark Chemical Company, Tulsa, Okla., a corporation of Delaware No Drawing. Application June 9, 1938, Serial No. 212,750

8 Claims. (Cl. 210—23)

Our invention relates to reduction of the alkalinity of water supplies and is capable of numerous industrial applications of which the following may be considered as typical.

Frequently where municipal water supplies are drawn from sources such that the water is relatively hard, they are softened by a lime or lime-soda ash treatment which precipitates most of the materials causing the hardness and enables them to be removed by settling, but this leaves the softened water with residual alkalinity due principally to the presence of small amounts of magnesium and calcium hydroxides and carbonates dissolved in the water; magnesium hydroxide and calcium carbonate may also be present as colloidal sols. These substances, including the sols, commonly exist in the water in an amount of the order of 30 to 55 parts per million and the sols tend to precipitate in and clog the sand filters through which the water is usually subsequently passed and also gradually precipitate on the pipes through which it is conducted; it is therefore desirable to reduce them, whether in solution or present as sols, to from 0 to 5 parts per million before the water is filtered or turned into the pipe lines. Various methods of accomplishing this have been proposed, the most satisfactory of which is by controlled introduction of carbon dioxide which if carried far enough converts to the soluble bicarbonates the small amounts of these calcium and magnesium compounds remaining in the water; however this practice is open to certain objections including the difficulty of obtaining a satisfactory $CO_2$ gas and of bringing it into intimate contact with the water. As far as we are aware, the most successful practice heretofore in vogue is that in which the gas is derived from combustion of high grade choke and then thoroughly scrubbed before introduction to the water through various types of diffusing apparatus; thus even under the best operating conditions the method is unduly expensive because of the initial cost of the apparatus required and the cost of producing and scrubbing the gas, while the various kinds of diffusing apparatus heretofore devised for introducing the cleaned gas to the water are not entirely efficient in the performance of their intended function. The method of our invention, however, can be efficiently and economically employed to reduce or eliminate this residual alkalinity of water supplies following a lime or lime-soda ash softening treatment and also, if desired, to lower the pH of the water sufficiently to prevent precipitation of ferrous iron therefrom, Our method is equally applicable to the treatment of salt water derived from oil wells which is to be returned to the oil sands either to simply dispose of it without contamination of neighboring streams or to utilize it for "flooding" in accordance with the practice, now in vogue in many oil fields, of pumping large quantities of water into the oil formation so as to force or crowd the oil therein toward the wells. But irrespective of the purpose for which the well water is to be returned to the oil formation and, equally, if water for flooding be taken from streams or ponds, it must first be treated to clarify it and/or remove turbidity; for this purpose lime is frequently used and the water then has a residual alkalinity and contains the above described sols which tend to precipitate in and clog the pores of the oil sands and hinder further pumping of the water thereinto either for disposing of it or for driving oil to the wells. Our method can be effectively used to reduce or substantially nullify this alkalinity and to convert to the soluble bicarbonates all or nearly all the dissolved or suspended magnesium and calcium compounds before the water is pumped into the ground and also, should the water contain ferrous iron, to lower its pH sufficiently to prevent precipitation of that substance in the oil sands.

While the foregoing are typical of situations in which our method is of great utility, it is equally applicable to many others in which it is desired to carbonate large bodies of water by the use of carbon dioxide gas.

The hardness of water is due principally to the presence of bicarbonates of magnesium and calcium which may be converted to relatively insoluble magnesium hydroxide and calcium carbonate by treatment with lime or lime and soda ash. Consequently, depending on the extent of the treatment and/or the quantity of reagents used, a considerable proportion of the calcium and magnesium can be precipitated preparatory to removal by settling or other suitable procedure. However, some calcium carbonate and magnesium hydroxide remain as suspended colloidal sol material which very slowly precipitates and accumulates on the walls of the pipes, tanks and the like through which the water is subsequently passed unless it is first suitably filtered, sand-type filters being customarily used for the purpose. But as these become encrusted more or less rapidly by precipitation of the sol, it is quite usual to treat the softened water with an acidic reagent which, although somewhat increasing the final hardness of the water, is effective to re-convert the residual material into soluble compounds such as calcium and magnesium bicarbonates which do not affect the filter, and it has been found that $CO_2$ is a very desirable medium for this "back treatment" or carbonation. However, as we have pointed out, the use of $CO_2$ for this purpose has heretofore been open to numerous objections, but we have found that the carbonation of large bodies of water may be readily, efficiently and economically effected in accordance with the method of our invention by generation and liberation of hot products derived from combustion of a suitable gas in a burner submerged beneath the surface of a stream of the water to be carbonated.

Furthermore, depending on the extent to which the carbonation is carried, our method is effective to eliminate first that phase of the alkalinity of the water known as "causticity" arising from the presence of hydroxides; next that phase of alkalinity known as "basicity" arising from the presence of carbonates to attain that phase of alkalinity known as "bicarbonate alkalinity" because of the presence of bicarbonates, and finally, if the treatment be prolonged and sufficient $CO_2$ introduced, to lower the pH of the water sufficiently to inhibit precipitation of ferrous iron.

In the practice of the said method we prefer to utilize a burner of the general character of that disclosed in United States Letters Patent 2,086,902 issued to us July 13, 1937, together with suitable auxiliary apparatus for generating the combustible mixture of air and gas and conducting it thereto, and to submerge the burner to a suitable depth in the stream and proportion the volume of the latter so that all or substantially all the water will pass through the sphere of influence of the products of combustion as they are discharged from the burner to thereby insure thorough permeation of the water by the $CO_2$ when the burner is operating at its maximum or any lesser capacity.

As a fuel we prefer to employ natural gas, not only because it is relatively cheap but because it is usually available in or adjacent oil fields and cities which are dependent on hard water and utilize a lime or lime and soda-ash treatment for softening it, but other gaseous fuels may be utilized if desired provided, of course, they are sufficiently rich in carbon-bearing constituents to afford on combustion an adequate supply of $CO_2$.

As an example of the effectiveness of our method of water treatment we shall now refer to a test recently made in connection with the water supply of a certain municipality. This water, which was initially hard, had a residual content of magnesium and calcium hydroxides and carbonates of the order of 30 to 55 parts per million after subjection to a lime softening treatment and was conducted from a large reservoir to a filter plant through a 48" I. D. pipe the center of which was located approximately 8' below the water level in the reservoir. During the test the softened water passed through the pipe at the rate of approximately 6,000,000 gallons per 24 hours and a burner of the character of that disclosed in our said patent having an inside diameter of 3" was disposed coaxially of the pipe adjacent its point of connection with the reservoir, and thus approximately 8' below the level of the water therein with its open end pointing away from the reservoir so that the products of combustion were discharged from the burner in the same direction as the flow of water through the pipe. Consequently substantially all the water as it flowed past and beyond the burner traversed the sphere of influence of the products of combustion discharged therefrom into the water stream, and as these products were of course in very finely divided condition, an extremely intimate dispersion thereof in the water was therefore effected. This burner was capable of burning from 500 to 700 cubic feet of natural gas per hour depending, of course, on the pressure with which the combustible mixture was supplied, and it was possible by its use to reduce the alkalinity of the water when passing the burner at the rate of approximately 250,000 gallons per hour (6,000,000 gallons per 24 hours) to any desired point by suitably controlling the rate of generation of the $CO_2$; with the burner operating at less than maximum capacity, the causticity and basicity were reduced substantially to zero, and by increasing the gas and air supply we could readily introduce sufficient $CO_2$ into the water to reduce its pH appreciably below 7.

A burner of the size and character used in this test is capable of producing from 500,000 to 700,000 B. t. u.'s per hour with natural gas as a fuel and the rise in temperature resulting from the progressive release in one hour of this total quantity of heat in a stream of water flowing past the burner at the rate of 250,000 gallons per hour is substantially inappreciable, amounting to only about a quarter to a third of 1° F. It results that the chemical reaction which occurs during the practice of our method takes place substantially in the cold without material change in the temperature of the water which remains very nearly constant as the water passes the burner.

The apparatus required for the practice of our invention is of extremely simple character, is relatively inexpensive and after being placed in operation by lighting and submerging the burner requires substantially no attention. Moreover, the cost of the fuel in comparison with the amount of water which can be successfully treated per unit of fuel is low, the necessity for scrubbing the gases of combustion as when the $CO_2$ is evolved from the burning of coke is entirely obviated, and as the $CO_2$ is generated beneath the surface of and released directly into the water stream in finely divided condition no diffusing apparatus is required. The method is therefore of marked utility and wide industrial application.

A further advantage of our method when used in the treatment of water intended for flooding oil bearing strata or disposal in the earth, arises from the fact that the carbonation treatment may be readily carried beyond the point necessary to re-convert the residual calcium and/or magnesium sols into the bicarbonates and thus to a stage tending to lower its pH below 7. The precipitation of ferrous iron from these waters is of course undesirable as it has a clogging effect on the pores of the oil sands in general somewhat similar to that of the other substances to which reference has hitherto been made and with a view to oxidizing contained iron from the ferrous to the ferric state to prevent such precipitation, aeration of the water before it is discharged into the ground is frequently practised. However, it is extremely difficult to oxidize all the ferrous iron in this way and some of it therefore often remains unoxidized and ultimately slowly precipitates in the oil formations. Ferrous iron tends to precipitate at pHs above 7 and by carbonating the water in accordance with our method until its pH is lowered as far as possible, namely to about 5.2, retention of the ferrous iron in solution can be readily brought about. Moreover, water containing $CO_2$ and having a pH not higher than 7 has a solvent action on calcareous material acting as a cement between sand grains of a rock formation which action is not possessed by water of a higher pH or of some degree of alkalinity. Consequently when the water treated in accordance with our method is used for flooding, a more complete and effective penetration of the sandstone containing the oil is attained.

Of course if more $CO_2$ is discharged into the water than the amount required to bring its pH to about 5.2, the excess merely passes off and is unobjectionable irrespective of whether the water is to be used for human consumption or industrial purposes of the general character of those to which we have referred.

While we have herein described with considerable particularity one manner of performing our invention, we do not thereby desire or intend to restrict or confine ourselves thereto as the practice thereof is capable of numerous changes and modifications without departing from the spirit and scope of the invention as defined in the appended claims.

Having thus described our invention, we claim and desire to protect by Letters Patent of the United States:

1. The method of carbonating large volumes of water without appreciably raising the temperature thereof which comprises effecting combustion of a gaseous carboniferous fuel beneath the surface of the water and discharging the products of combustion directly thereinto while causing relative movement between it and the point of discharge to thereby intimately intermingle the combustion products and the water.

2. The method of continuously carbonating a flowing water supply which comprises continuously introducing below the level of the water stream a stream of a combustible mixture of air and a carboniferous gaseous fuel, burning the mixture within the confines of the water stream and immediately discharging the combustion products thereinto to thereby intimately intermingle said products with the flowing water.

3. The method of continuously treating a stream of water containing alkaline compounds to reduce its alkalinity which comprises generating beneath the surface of the water a continuous stream of gaseous combustion products including carbon dioxide and discharging said products into the water in finely divided condition and at elevated temperature while moving the water past the point of discharge with sufficient rapidity to maintain its temperature substantially constant.

4. The method of treating water containing small amounts of alkaline sols which comprises the steps of burning beneath the surface of the water a gaseous fuel adapted to evolve an acidic combustion product and without appreciably raising the temperature of the water discharging said product directly thereinto in gaseous state to thereby convert said sols to soluble compounds.

5. The method of treating a flowing supply of water containing finely divided substantially insoluble alkaline compounds which comprises effecting submerged combustion of natural gas in the water stream and immediate discharge of the combustion products thereinto to thereby carbonate the said compounds.

6. The method of treating a flowing supply of water containing finely divided substantially insoluble alkaline compounds which comprises introducing and burning beneath the surface of the water a combustible mixture of air and natural gas, discharging into the water the hot combustion products including a gas adapted to react with said compounds, and maintaining sufficiently rapid movement of the water past the point of discharge to inhibit appreciable increase in its temperature.

7. The method of carbonating water containing finely divided substantially insoluble alkaline compounds which comprises causing a stream of the water to move past a burner having its discharge outlet submerged therein, burning a mixture of air and a carboniferous gaseous fuel in the burner, and allowing the hot products of combustion to pass directly from said outlet into the stream.

8. The method of carbonating water containing finely divided substantially insoluble alkaline compounds which comprises causing a stream of the water to move past a burner having its discharge outlet submerged therein, burning a mixture of air and a carboniferous gaseous fuel in the burner, allowing the hot products of combustion to pass directly from said outlet into the stream, and maintaining a relation between the volume of water flow and the volume of said products such that substantially all of the water in its passage past the burner is subjected to the action of the evolved carbon dioxide.

HENRY W. DOENNECKE.
EMORY W. DOUGLASS.
CARL O. ANDERSON.